United States Patent
Wood et al.

(10) Patent No.: US 9,113,598 B2
(45) Date of Patent: Aug. 25, 2015

(54) GRAIN CART HAVING AN INCLINED FOLDING UNLOADING AUGER CONVEYOR WITH AN ASKEWED FLOW CONTROL SPOUT

(75) Inventors: James E. Wood, Ft. Recovery, OH (US); Joshua P. Gaerke, Ft. Recovery, OH (US)

(73) Assignee: J. & M. Manufacturing Co., Inc., Ft. Recovery, OH (US)

( * ) Notice: Subject to any disclaimer, the term of this patent is extended or adjusted under 35 U.S.C. 154(b) by 690 days.

(21) Appl. No.: 13/506,009

(22) Filed: Mar. 20, 2012

(65) Prior Publication Data

US 2013/0251484 A1 Sep. 26, 2013

(51) Int. Cl.
| | |
|---|---|
| A01D 90/10 | (2006.01) |
| B60P 1/42 | (2006.01) |
| A01D 43/073 | (2006.01) |

(52) U.S. Cl.
CPC .............. *A01D 90/10* (2013.01); *A01D 43/073* (2013.01); *B60P 1/42* (2013.01)

(58) Field of Classification Search
CPC ........ A01D 43/073; A01D 90/10; B60P 1/42; B65G 65/32
USPC ............... 198/536, 550.2, 641, 671; 414/335, 414/523, 526
See application file for complete search history.

(56) References Cited

U.S. PATENT DOCUMENTS

| | | | | |
|---|---|---|---|---|
| 275,758 | A * | 4/1883 | Felthousen | 198/548 |
| 420,131 | A * | 1/1890 | Walrath | 198/536 |
| 1,798,231 | A * | 3/1931 | Thiemann | 198/536 |
| 2,767,963 | A * | 10/1956 | Ringen et al. | 198/536 |
| 3,126,109 | A * | 3/1964 | Loschen | 414/335 |
| 3,144,928 | A * | 8/1964 | Roloson | 198/536 |
| 3,342,300 | A * | 9/1967 | Foy | 198/641 |
| 3,844,433 | A * | 10/1974 | Laajala | 414/505 |
| 4,074,802 | A * | 2/1978 | Hudis | 198/315 |
| 5,167,581 | A * | 12/1992 | Haag | 460/114 |
| 5,340,265 | A | 8/1994 | Grieshop | |
| 5,343,995 | A * | 9/1994 | Scarrow | 198/311 |
| 5,575,316 | A * | 11/1996 | Pollklas | 141/198 |
| 6,296,435 | B1 | 10/2001 | Wood et al. | |
| 6,497,546 | B2 | 12/2002 | Wood et al. | |
| 6,974,021 | B1 * | 12/2005 | Boevers | 198/550.2 |
| 7,134,830 | B2 | 11/2006 | Wood | |
| 7,584,836 | B2 * | 9/2009 | McCully et al. | 198/671 |
| 7,938,613 | B2 * | 5/2011 | Yoder et al. | 414/518 |
| 8,047,757 | B1 | 11/2011 | Wood | |
| D667,850 | S * | 9/2012 | Wood et al. | D15/28 |

* cited by examiner

*Primary Examiner* — James Keenan
(74) *Attorney, Agent, or Firm* — Jacox, Meckstroth & Jenkins

(57) ABSTRACT

A grain cart has a wheel supported container with an inclined auger unloading conveyor having an inclined lower section positioned to receive grain from the container and an upper section supported for folding movement between a stored position adjacent the container and an inclined discharge position projecting upwardly, forwardly and laterally outwardly from the left side wall of the container. The upper section of the auger conveyor has a tubular housing with an askewed discharge spout supporting a pivotable flow control spout for tilting movement on a horizontal axis extending parallel to the left side wall of the container for discharge of grain laterally across an open top rectangular semi-trailer within a vertical plane perpendicular to the left side wall of the cart. The flow control spout is tilted by a remotely controlled actuator for filling and topping off the semi-trailer including all four corner portions of the trailer.

3 Claims, 4 Drawing Sheets

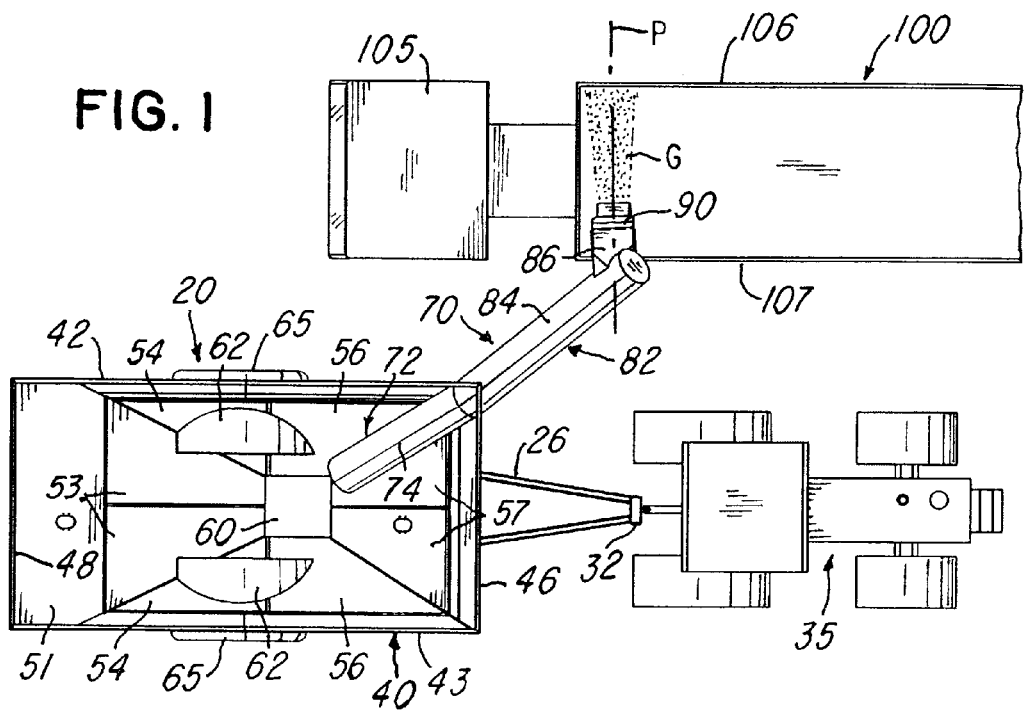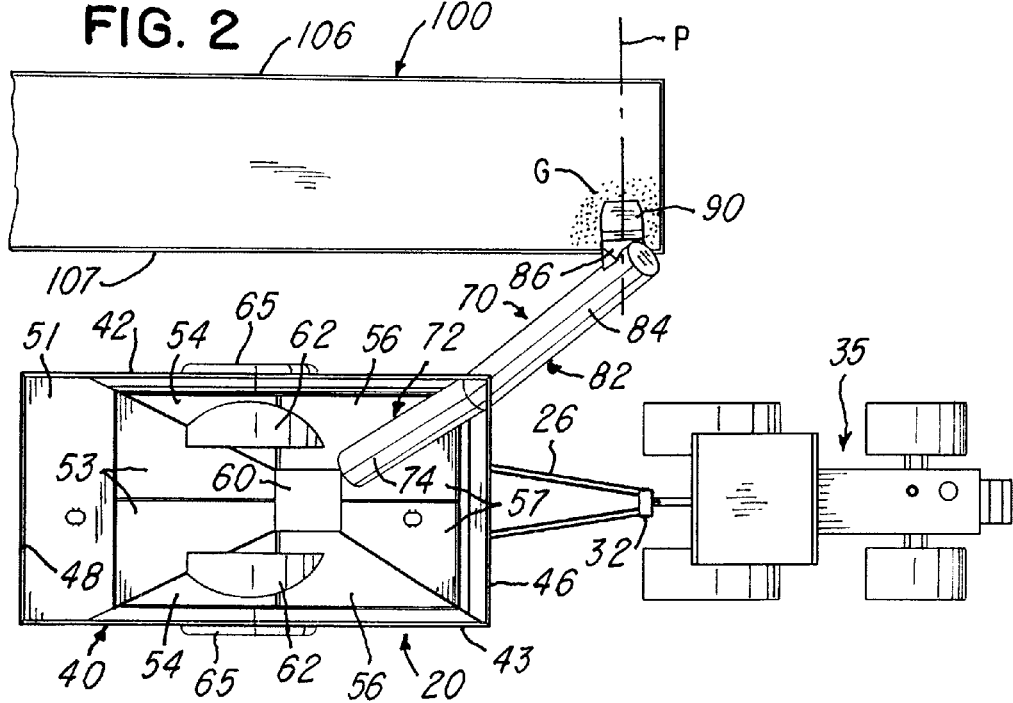

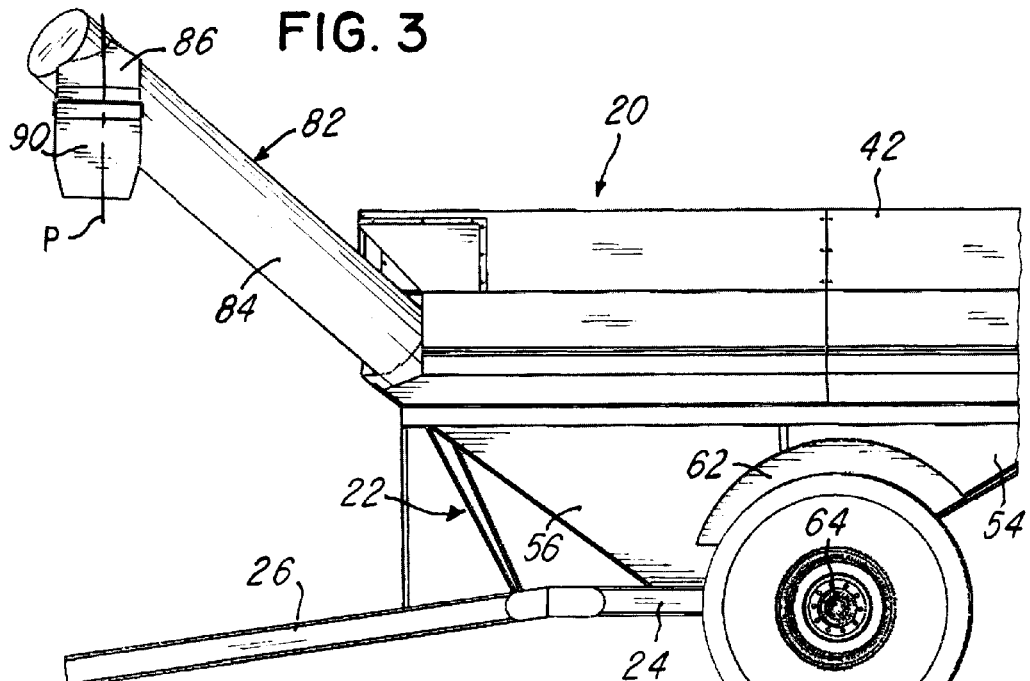
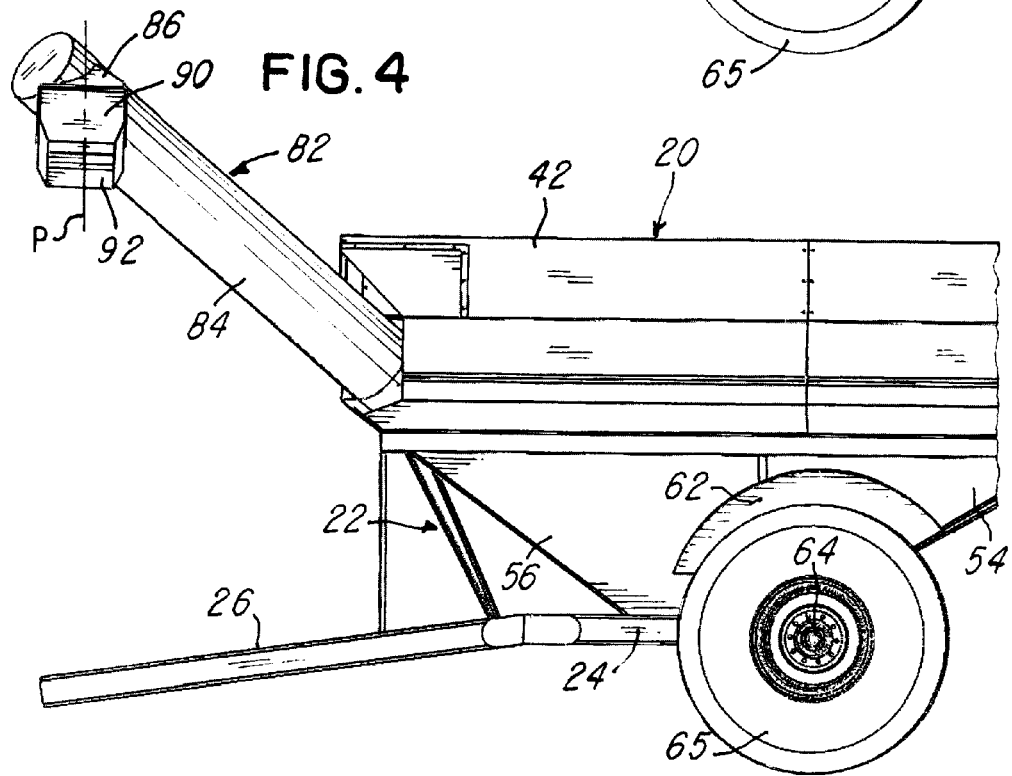

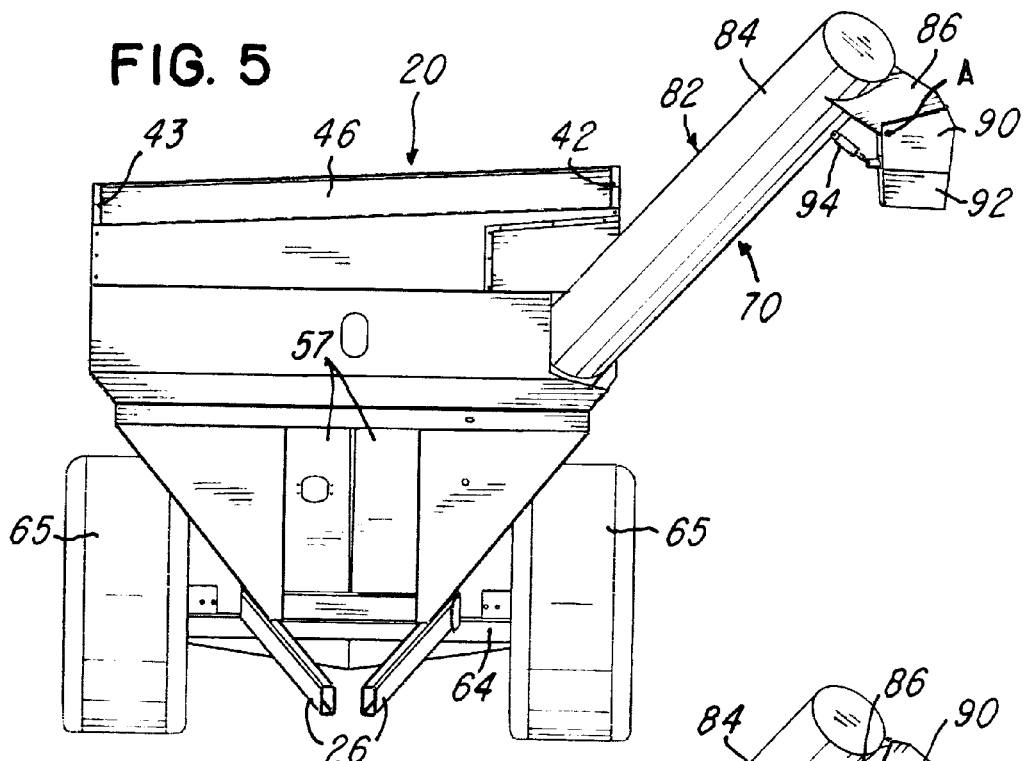
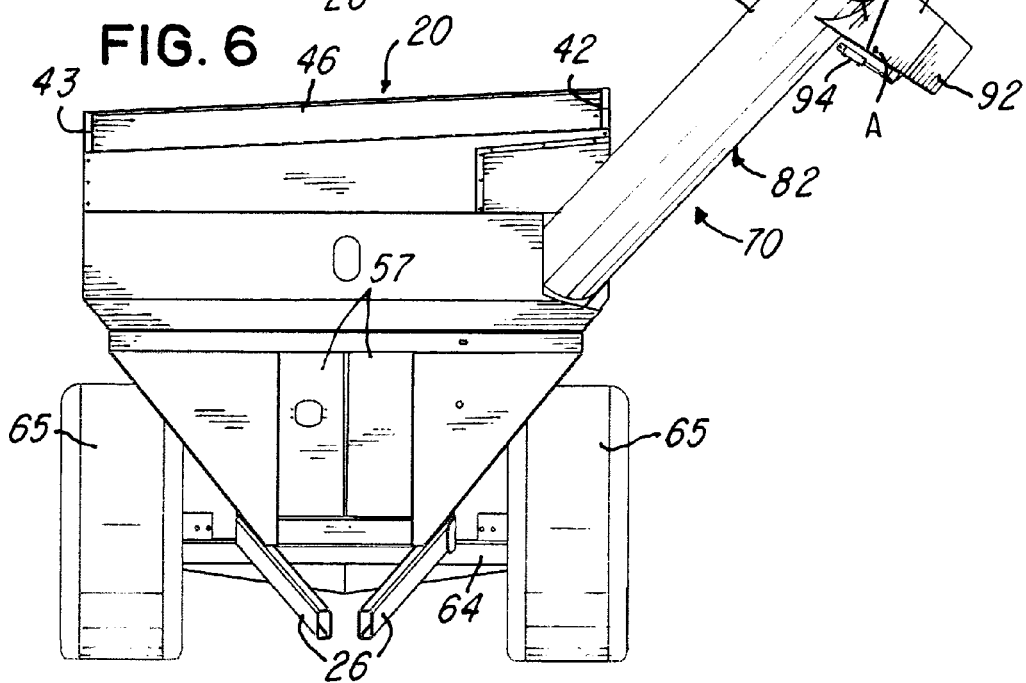

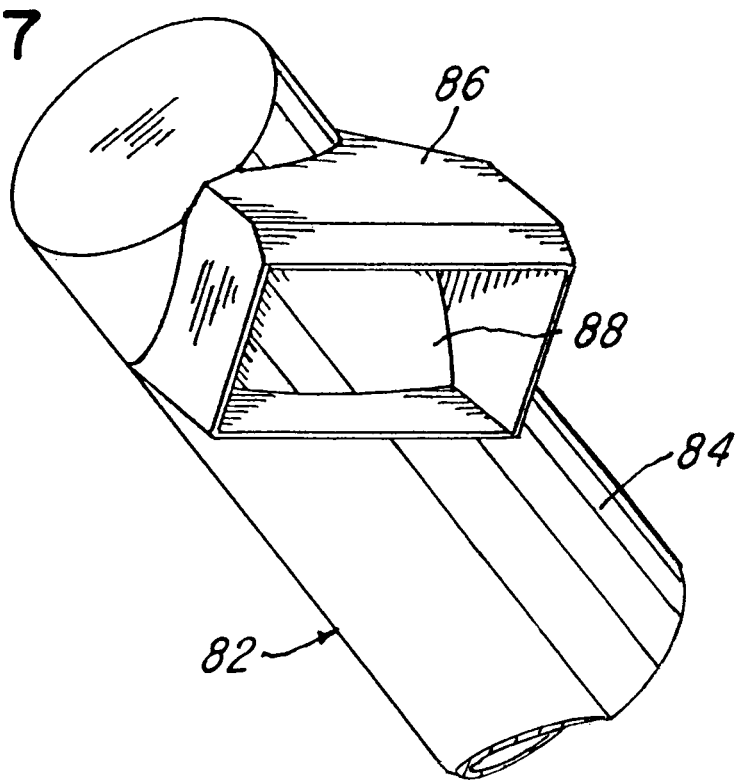

GRAIN CART HAVING AN INCLINED FOLDING UNLOADING AUGER CONVEYOR WITH AN ASKEWED FLOW CONTROL SPOUT

BACKGROUND OF THE INVENTION

The present invention relates to a grain wagon or grain cart having a unloading auger conveyor and of the type disclosed in U.S. Pat. Nos. 5,340,265, 6,296,435, 6,497,546, 7,134,830 and 8,047,757 which issued to the assignee of the present invention and the disclosures of which are herein incorporated by reference. The grain carts are usually pulled by a tow tractor for transporting grain from a harvesting combine in a field to an open top semi-trailer which transports the grain over the road to a grain elevator for drying and storage. The grain cart has a power driven single auger grain unloading conveyor which includes an inclined lower auger conveyor section extending adjacent an inclined front left corner portion of the grain cart container. An upper auger conveyor section extends from the lower section and projects upwardly, laterally outwardly and forwardly from the container in a grain discharge position so that the discharging of the grain can be conveniently viewed by the driver of the tow tractor. The upper auger conveyor section is pivoted by a fluid cylinder between the discharge position and a stored position adjacent the front wall of the container, as shown in the above-mentioned patents. The front folding upper auger conveyor section also enables the driver of the tow tractor to view all movements of the upper conveyor section between its stored position and its grain discharge position.

Grain carts having an inclined folding unloading auger as disclosed in the above-mentioned patents have been produced by the assignee of the patents, and similar grain carts with a folding unloading auger have been produced by other companies for over 20 years. When the grain is unloaded and discharged into an open top rectangular semi-trailer for delivery to a grain elevator, the grain is discharged from the auger conveyor through a discharge spout which has its axis in the plane of the auger axis. As a result, the grain does not completely fill opposite corner portions of the open top rectangular semi-trailer unless a person climbs into the trailer or onto a wall of the trailer and manually pulls or moves the grain into the opposite corner portions of the trailer with a shovel or other tool. If the grain is not manually moved to fill up the opposite corner portions, the opposite corner portions of the trailer are not topped off with grain as is the rest of the semi-trailer, and the grain is transferred to the grain elevator without the entire semi-trailer filled and topped off with grain including the opposite corner portions. One attempt to fill more of the opposite corner portions of a rectangular semi-trailer with grain being discharged from the unloading auger was to mount the discharge spout on the conveyor housing so that the spout may be oscillated back and forth on the axis of the conveyor auger. However, the rotatable discharge spout still does not completely fill opposite corner portions of the semi-trailer.

SUMMARY OF THE INVENTION

The present invention is directed to a grain cart having a unloading auger conveyor with an upper section supported for folding movement between a retracted stored position adjacent the grain cart container and an extended operating discharge position projecting upwardly, forwardly and laterally outwardly from the left front corner of the container, as disclosed in the above-mentioned patents. The upper section of the auger conveyor includes a cylindrical housing having an askewed discharge spout defining an outlet which is directed laterally outwardly in a substantially vertical plane perpendicular to the left side wall of the container. A flow control spout is supported by the discharge spout for tilting movement on a substantially horizontal axis extending substantially parallel to the left side wall of the container. The flow control spout is movable by a remotely controllable actuator within the perpendicular vertical plane between a downwardly projecting position and a laterally outwardly projecting position so the grain may be discharged from the auger conveyor into a rectangular semi-trailer back and forth across the width of the trailer in order to fill and top off the semi-trailer including all four corner portions of the trailer.

Other features and advantages of the grain cart will be apparent from the following description, the accompanying drawings and the appended claims.

BRIEF DESCRIPTION OF THE DRAWINGS

FIG. 1 is a diagrammatic plan view of a grain cart constructed in accordance with the invention and pulled by a tow tractor along the side wall of a semi-trailer and illustrating grain being discharged laterally outwardly into the front right corner portion of the semi-trailer;

FIG. 2 is a plan view similar to FIG. 1 and illustrating grain being discharged into the rear left corner portion of the semi-trailer;

FIG. 3 is a fragmentary side elevational view of the grain cart shown in FIGS. 1 & 2 and with the flow control spout positioned as shown in FIG. 2 to discharge grain downwardly into the front and rear left corner portions of the semi-trailer;

FIG. 4 is an elevational view similar to FIG. 3 and showing the flow control spout in a position as shown in FIG. 1 for discharging grain laterally outwardly to fill the front and rear right corner portions of the semi-trailer;

FIG. 5 is a fragmentary front view of the grain cart shown in FIG. 3;

FIG. 6 is a fragmentary front view of the grain cart shown in FIG. 4; and

FIG. 7 is a fragmentary perspective view of the upper end portion of the auger housing and illustrating the skewed position of the discharge portion and discharge outlet of the auger housing.

DETAILED DESCRIPTION OF THE ILLUSTRATED EMBODIMENT

FIG. 1 illustrates a grain wagon or cart 20 which has a general construction similar to the grain cart disclosed in above-mentioned U.S. Pat. No. 6,296,435. In general, the grain cart 20 has a fabricated frame 22 (FIG. 3) including longitudinally extending tubular steel frame members 24 rigidly connected by cross-tubular steel frame members. The frame members converge at the front of the cart to form a tongue 26 having a hitch 32. The hitch is pivotally connected to a tow vehicle 35 such as a farm tractor, as shown in FIGS. 1 and 2. A fabricated sheet metal grain hopper or container 40 is supported by the frame 22 and includes opposite side walls 42 and 43, a front wall 46 and a rear wall 48 rigidly connected by inclined bottom walls or panels 51, 53, 54, 56 and 57 all of which slope downwardly to a sump 60. A set of opposing fabricated sheet metal wheel well covers 62 project inwardly from inclined bottom walls 53, 54 and 56. As shown in FIGS. 5 and 6, an axle 64 supports the frame 22 and the container 40 and receives a set of rubber tire wheels 65.

The grain cart 20 includes an inclined auger-type grain unloading conveyor 70 which includes a lower conveyor section 72 formed by a tubular or cylindrical sheet metal housing 74 and enclosing an auger having a helical flight welded to a shaft, as more specifically disclosed in above-mentioned U.S. Pat. No. 8,047,757. The auger conveyor 70 also includes an upper auger conveyor section 82 formed by a tubular or cylindrical sheet metal housing 84 enclosing an auger formed by a helical flight welded to a shaft. The above-mentioned patents also disclose that the fixed lower auger conveyor section 62 is pivotally connected to the upper auger conveyor section 82 by a hinge structure which provides for folding the upper conveyor section 82 between a stored position adjacent the front wall 46 of the container 40 and an inclined discharge position projecting upwardly, forwardly and laterally outwardly from the left front corner portion of the container 40. In the discharge position, the axis of the upper conveyor section 82 extends at an angle between 44° and 57° from a vertical plane parallel to the front wall 46, at an angle between 26° and 36° from a horizontal floor plane, and at an angle between 37° and 46° from a vertical plane parallel to the left side wall 42. As also disclosed in the above-mentioned patents, the upper conveyor section 82 is moved between its stored position and its discharge position by a hydraulic cylinder which is controlled from the cab of the tow tractor 35.

In accordance with the present invention, the cylindrical housing 84 of the upper conveyor section 82 includes a fabricated sheet metal discharge spout 86 (FIG. 7) welded to the housing 84 in a position askewed relative to the axis of the housing 84 and has a horizontally extending rectangular discharge outlet 88 open to the inside of the housing 84 of the upper conveyor section. The discharge spout 86 supports a flow control member preferably in the form of a tubular flow control spout 90 (FIGS. 3-6) for pivotal movement on a substantially horizontal axis A (FIGS. 5 & 6) which extends substantially parallel to the left side wall 42 of the grain cart container 40. The flow control spout 90 pivots on the axis A between a downwardly projecting position (FIGS. 3 & 5) with its rectangular outlet 92 directed downwardly, and an inclined position (FIGS. 4 & 6) where the outlet 92 projects laterally outwardly and downwardly. Movement of the flow control spout 90 is produced by an actuator in the form of a hydraulic cylinder 94 preferably controlled remotely by a control valve within the cab of the tractor 35, as disclosed in above-mentioned U.S. Pat. No. 6,296,435.

Referring to FIGS. 1 & 2, after the container 40 of the grain cart is filled with grain in the field by the cart following alongside a harvester or combine which transfers the grain to the grain cart, the grain cart is towed by the tractor 35 usually to the edge of the field and alongside a rectangular open top semi-trailer 100 connected to a semi-truck 105. After the upper auger conveyor section 82 is pivoted to its extended discharge position, the discharge spout 86 and flow control spout 90 are positioned adjacent one end of the semi-trailer where the flow control spout 90 is pivoted in a vertical plane P back and forth between its downwardly projecting position (FIGS. 3 & 5) and its laterally outwardly projecting position (FIGS. 4 & 6) so that grain G is discharged back and forth between side walls 106 and 107 of the rectangular open top semi-trailer 100 until the grain fills and tops off the front portion of the trailer including both front corner portions of the trailer. The grain cart 20 is then pulled forwardly by the tow tractor 35 so that the semi-trailer 100 is progressively filled and topped off between the side walls 106 and 107 of the trailer.

When the grain cart arrives at the rear or opposite end of the rectangular semi-trailer 100, the flow control spout 90 continues to be pivoted laterally back and forth in the vertical plane P while discharging grain G so that the grain fills and tops off a rear portion of the trailer including both rear corner portions of the semi-trailer. For illustration in FIG. 2, the flow control spout 90 is shown in its downwardly projecting position (FIGS. 3 & 5) where the grain G is discharged downwardly to fill the left rear corner portion of the trailer. FIG. 1 shows the flow control spout 90 in its laterally outwardly projecting position (FIGS. 4 & 6) with grain G filling the front right corner portion of the semi-trailer. It is apparent that movement of the grain cart 20 relative to the semi-trailer 100 during discharging grain from the flow control spout 90 into the rectangular chamber of the semi-trailer may be selected by the driver of the tow tractor 35 in order to progressively fill and top off the entire semi-trailer 100 including all four corner portions of the trailer. The driver of the tow tractor may also conveniently view the filling and topping off of the semi-trailer from the cab of the tractor 35 to insure that the entire semi-trailer is completely filled with grain.

While the form of grain cart herein described constitutes a preferred embodiment of the invention, it is to be understood that the invention is not limited to this precise form of the grain cart disclosed, and that changes made therein without departing from the scope and spirit of the invention as defined in the appended claims.

What is claimed is:

1. In a grain cart adapted to be pivotally connected to a tow tractor for transferring grain from a field to an elongated rectangular open-top semi-trailer, said cart including a frame supported for traversing the ground and having a hitch for pivotally connecting said frame to the tow tractor, a container supported by said frame for receiving a volume of grain and including a left side wall and a right side wall connected by a front wall and a rear wall, an elongated inclined auger unloading conveyor including a motor driven auger with a helical flight within a tubular auger housing, with said conveyor having an inclined lower section and an upper section, said lower section of said auger conveyor mounted on said container and positioned to receive grain from said container, said upper section of said auger conveyor supported for folding movement between a retracted stored position adjacent said container and an extended operating discharge position inclined upwardly and forwardly and laterally outwardly from a front corner portion of said container, the improvement wherein said housing of said upper section of said auger conveyor in said discharge position inclined upwardly and forwardly and laterally outwardly including a discharge spout projecting laterally at an askewed angle from said housing, said discharge spout supporting a flow control spout for tilting movement on a substantially horizontal axis askewed with respect to an axis of said auger within said upper section, with said horizontal axis extending substantially parallel to a side wall of said container, said control spout movable on said horizontal axis in a vertical plane spaced forwardly of said front wall of said container and perpendicular to said side wall of said container between a downwardly projecting first position and a laterally outwardly projecting second position, and a remotely controllable actuator connected to tilt said flow control spout between said first and second positions on said horizontal axis when said upper conveyor section is in said inclined discharge position for uniformly filling and topping off the semi-trader with grain including the filling of all four corner portions of the rectangular semi-trailer.

2. A grain cart as defined in claim 1 wherein said discharge spout is secured to said housing of said upper section of said conveyor and projects at said askewed angle from said housing, and said discharge spout has parallel spaced and substantially vertical side walls supporting said flow control spout for said tilting movement in said vertical plane perpendicular to said side wall of said container when said upper conveyor section is in said inclined discharge position.

3. A grain cart as defined in claim 2 wherein said flow control spout has substantially parallel spaced side walls extending in generally vertical planes when said upper conveyor section is in said inclined discharge position, and said side walls of said control spout are connected to said side walls of said discharge spout for pivotal movement on said horizontal axis.

* * * * *